US009069562B2

(12) United States Patent
Abadi et al.

(10) Patent No.: US 9,069,562 B2
(45) Date of Patent: Jun. 30, 2015

(54) MOBILE COMPUTING PROGRAM SLICING AND BEHAVIOR

(71) Applicant: International Business Machines Corporation, Armonk, NY (US)

(72) Inventors: Aharon Abadi, Eilat (IL); Moria Abadi, Petah-Tikva (IL); Idan Ben-Harrush, Givat Elah (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/060,631

(22) Filed: Oct. 23, 2013

(65) Prior Publication Data
US 2015/0113501 A1  Apr. 23, 2015

(51) Int. Cl.
*G06F 9/44* (2006.01)

(52) U.S. Cl.
CPC ........................................ *G06F 8/38* (2013.01)

(58) Field of Classification Search
USPC .................................. 717/105–109, 120–121
IPC ........... G06F 220/86,220/865, 11/362, 11/3664, G06F 11/3668
See application file for complete search history.

(56) References Cited

U.S. PATENT DOCUMENTS

| | | | | |
|---|---|---|---|---|
| 6,601,234 B1 * | 7/2003 | Bowman-Amuah | ......... | 717/108 |
| 7,089,542 B2 * | 8/2006 | Brand et al. | .................. | 717/143 |
| 7,174,536 B1 * | 2/2007 | Kothari et al. | ................ | 717/109 |
| 7,620,946 B2 * | 11/2009 | Russell | ......................... | 717/157 |
| 7,694,276 B2 * | 4/2010 | Larus et al. | .................... | 717/116 |
| 7,735,060 B2 * | 6/2010 | Harvey et al. | ................. | 717/107 |
| 7,926,043 B2 * | 4/2011 | Vaswani et al. | ............... | 717/130 |
| 8,108,830 B2 * | 1/2012 | Bibr et al. | ...................... | 717/107 |
| 8,122,436 B2 * | 2/2012 | Costa et al. | .................... | 717/128 |
| 8,266,598 B2 * | 9/2012 | Gulwani et al. | ............... | 717/130 |
| 8,291,374 B2 | 10/2012 | Cullum et al. | | |
| 8,473,901 B1 * | 6/2013 | Johnson | ......................... | 717/110 |
| 8,479,154 B1 * | 7/2013 | Friedman | ...................... | 717/106 |
| 8,484,625 B2 * | 7/2013 | Saha et al. | .................... | 717/135 |
| 8,522,219 B2 * | 8/2013 | Schwarzbauer et al. | ...... | 717/143 |
| 8,566,818 B2 * | 10/2013 | Young et al. | .................. | 717/174 |
| 8,612,954 B2 * | 12/2013 | Abadi et al. | .................. | 717/155 |
| 8,769,507 B2 * | 7/2014 | Bantz et al. | ................... | 717/136 |
| 8,898,623 B2 * | 11/2014 | Zhao et al. | .................... | 717/105 |

OTHER PUBLICATIONS

Jing et al, "Client-Server Computing in Mobile Environments", ACM Computing Surveys, vol. 31, No. 2, pp. 117-157, 1999.*
Dunham et al, "A mobile transaction model that captures both the data and movement behavior", ACM-Mobile Networks and Applications, pp. 149-162, 1997.*
Ebling et al, "The Importance of Translucence in Mobile Computing Systems", ACM Transactions on Computer-Human Interaction, vol. 9, No. 1, pp. 42-67 , 2002.*
Papadimitratos et al, "Secure Data Transmission in Mobile Ad Hoc Networks", ACM, pp. 41-50, 2003.*

(Continued)

*Primary Examiner* — Anil Khatri (57) ABSTRACT

Techniques for computer program slicing are described herein. The techniques include screens of a mobile computing program having a behavior. The method may include determining a subset of screens associated with the behavior. A slice of the mobile computing program may be generated based on the subset of screens of the mobile computing program such that the slice produces the same behavior of the mobile computing program.

17 Claims, 6 Drawing Sheets

(56) References Cited

OTHER PUBLICATIONS

Mark Weiser, "Program Slicing", IEEE Transactions on Software Engineering, vol. SE10, No. 4, Jul. 1984.

Horwitz et al., "Interprocedural slicing using dependence graphs", PLDI '88 Proceedings of the ACM SIGPLAN 1988 conference on Programming Language design and Implementation, pp. 35-46.

Maras et al., "Client-side Web Application Slicing", 26th IEEE/ACM International Conference on Automated Software Engineering (ASE), 2011, pp. 504-507.

Xiao et al., "Slicing*-Tree Based Web Page Transformation for Small Displays", CIKM '05 Proceedings of the 14th ACM international conference on Information and knowledge management, pp. 303-304, 2005.

* cited by examiner

MOBILE COMPUTING PROGRAM SLICING AND BEHAVIOR

BACKGROUND

The present invention relates to analysis of computer programs. Program analysis plays an important role in a variety of software engineering processes, such as program slicing. Program slicing includes determining a portion of a computer program that functions the same for a given element in the computer program or the portion of the computer program. In other words, starting from a subset of a program's behavior, program slicing may reduce that program to a minimal form that still produces the behavior.

SUMMARY

In one embodiment, a method for generating a slice of a mobile computing program is described herein. The method may include identifying screens of a mobile computing program having a behavior and determining a subset of screens associated with the behavior. A slice of the mobile computing program may be generated based on the subset of screens of the mobile computing program such the slice produces the same behavior of the mobile computing program.

In another embodiment, a computing device including a storage device and a processor is described herein. The storage device includes instructions that when executed by the processor, cause the computing device to identify screens of a mobile computing program having a behavior and determine a subset of screens associated with the behavior. A slice of the mobile computing program is generated based on the subset of screens of the mobile computing program such the slice produces the same behavior as the mobile computing program.

In yet another embodiment, a tangible computer-readable medium comprising instructions to direct a processor to carry out operations is described herein. The operations include identifying screens of a mobile computing program having a behavior and determining a subset of screens associated with the behavior. A slice of the computing program may be generated based on the subset of screens of the mobile computing program such the slice produces the same behavior of the computing program.

DETAILED DESCRIPTION

The subject matter disclosed herein relates to techniques for generation of a slice of a computer program. A computer program, as referred to herein, may be an application have a screen-oriented architecture, such as in a mobile application, or an enterprise application. The techniques described herein include generating a slice of a mobile computing program, or a subprogram, based on the screens of the mobile computing program such that the subprogram slice behaves in the same manner for a given function as the mobile computing program from which the subprogram slice was generated.

Figure 1:
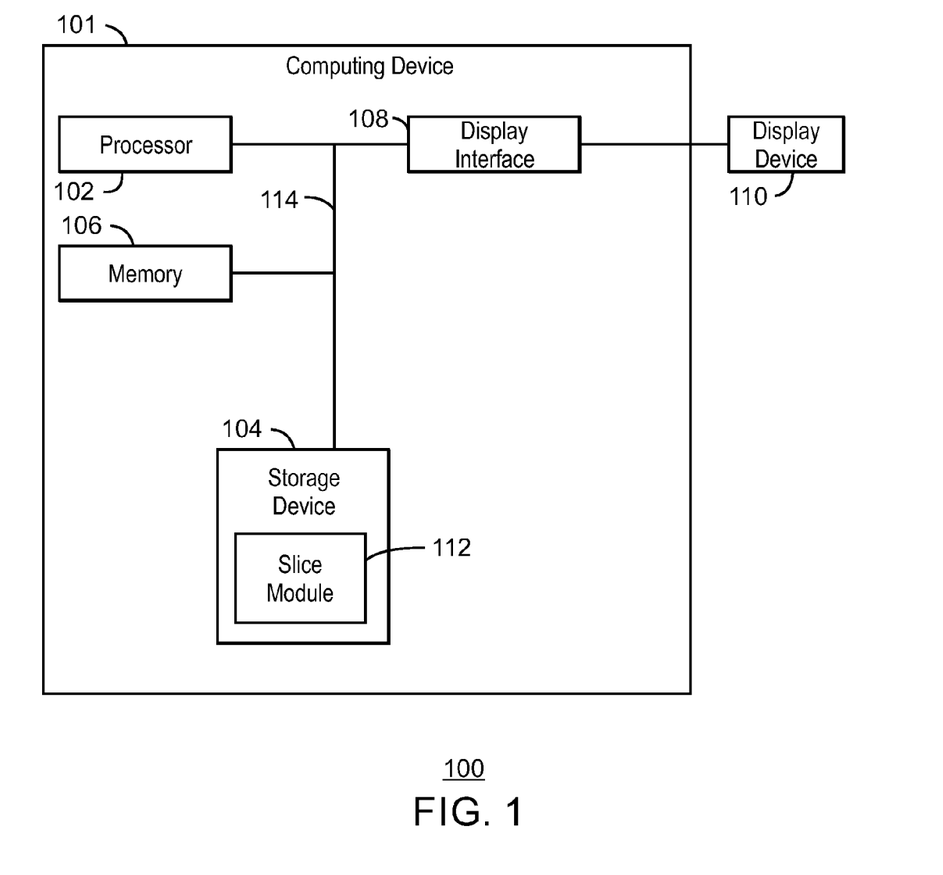
FIG. 1 is a block diagram of a computing system configured to generate a slice of a mobile computing program.

FIG. 1 is a block diagram of a computing system configured to generate a slice of a mobile computing program. The computing system 100 may include a computing device 101 having a processor 102, a storage device 104 comprising a non-transitory computer-readable medium, a memory device 106, a display interface 108 communicatively coupled to a display device 110. The storage device 104 may include a slice module 112 configured to generate a slice of a given computer program. In embodiments, the slice may be identified as a portion of a graph representing the mobile computing program based on screens of the mobile computing program as discussed in more detail below. In some embodiments, the display interface 108 may enable a user of the computing system 101 to view the graph via the display device 110. The display device 110 may be an external component to the computing device 101, an integrated component of the computing device 101, or any combination thereof.

The slice module 112 may be logic, at least partially comprising hardware logic. In embodiments, the slice module 112 may be implemented as instructions executable by a processing device, such as the processor 102. The instructions may direct the processor 102 to identify screens of a mobile computing program having a behavior. The screens are graphical user interface implementations of the mobile computing program. In some embodiments, the screens are configured to be displayed on a mobile device, such as a smart phone, tablet computer, personal computing device and the like. The screen-oriented design of mobile computing programs, such as mobile applications, enables such programs to be analyzed based on the screens. The slice module 112 determines a subset of screens associated with a given behavior of one screen, and generates a subprogram slice based on the subset of screens of the mobile computing program such that the subprogram slice produces the same behavior of the mobile computing program.

The processor 102 may be a main processor that is adapted to execute the stored instructions. The processor 102 may be a single core processor, a multi-core processor, a computing cluster, or any number of other configurations. The memory unit 106 can include random access memory, read only memory, flash memory, or any other suitable memory systems. The main processor 102 may be connected through a system bus 114 to components including the memory 106, the storage device 104, and the display interface 108.

The block diagram of FIG. 1 is not intended to indicate that the computing device 101 is to include all of the components shown in FIG. 1. Further, the computing device 101 may include any number of additional components not shown in FIG. 1, depending on the details of the specific implementation.

Figure 2:
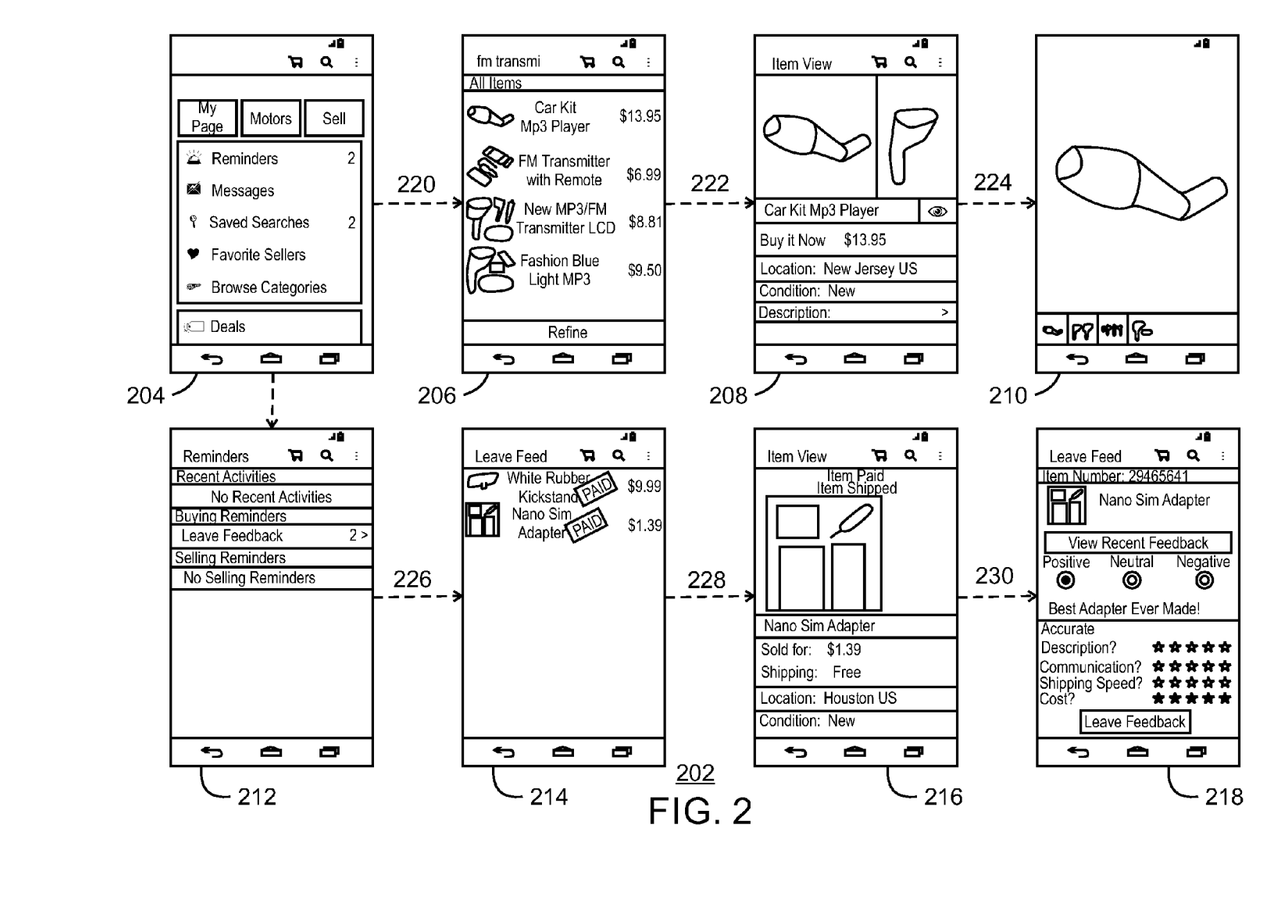
FIG. 2 is an example illustration of screens of a mobile application used to form a finite state machine graph.

FIG. 2 is an example illustration of screens of a mobile application used to form a finite state machine graph. The computer program 202 may include screens 204, 206, 208, 212, 214, 216, 218, wherein control flow of transitions from one screen to another screen are indicated by the dashed arrows 220, 222, 224, 226, 228, 230. The arrows 220, 222, 224, 226, 228, 230 are control flow arrows discussed in more detail below in reference to FIG. 3. As computer programs implemented as mobile applications are increasingly screen-oriented, representations of such computer programs may include the screens as nodes of a finite state machine graph, while dataflow between the screens may be represented as edges of the finite state machine graph.

As illustrated in FIG. 2, the computer program 202 may be a mobile application of an auction website having two general control paths. In a first control path, at screen 204, a search query may be entered and the results of the query may be presented at screen 206. If a user selects an item in the resulting query of screen 206, a selected item is presented at screen 208. If the user selects an image associated with the selected item, a larger image may be presented at screen 210. In a second control path, screen 212 presents reminders when the user selects reminders on screen 204. If the user selects to leave feedback on screen 212, purchased items for which feedback has not yet been submitted is presented on screen 214. When one of the purchases on screen 214 is selected, the chosen item may be displayed at screen 216. If the user selects to leave feedback from the chosen item at screen 216, screen 218 enables the user to leave feedback for the chosen item.

Figure 3:
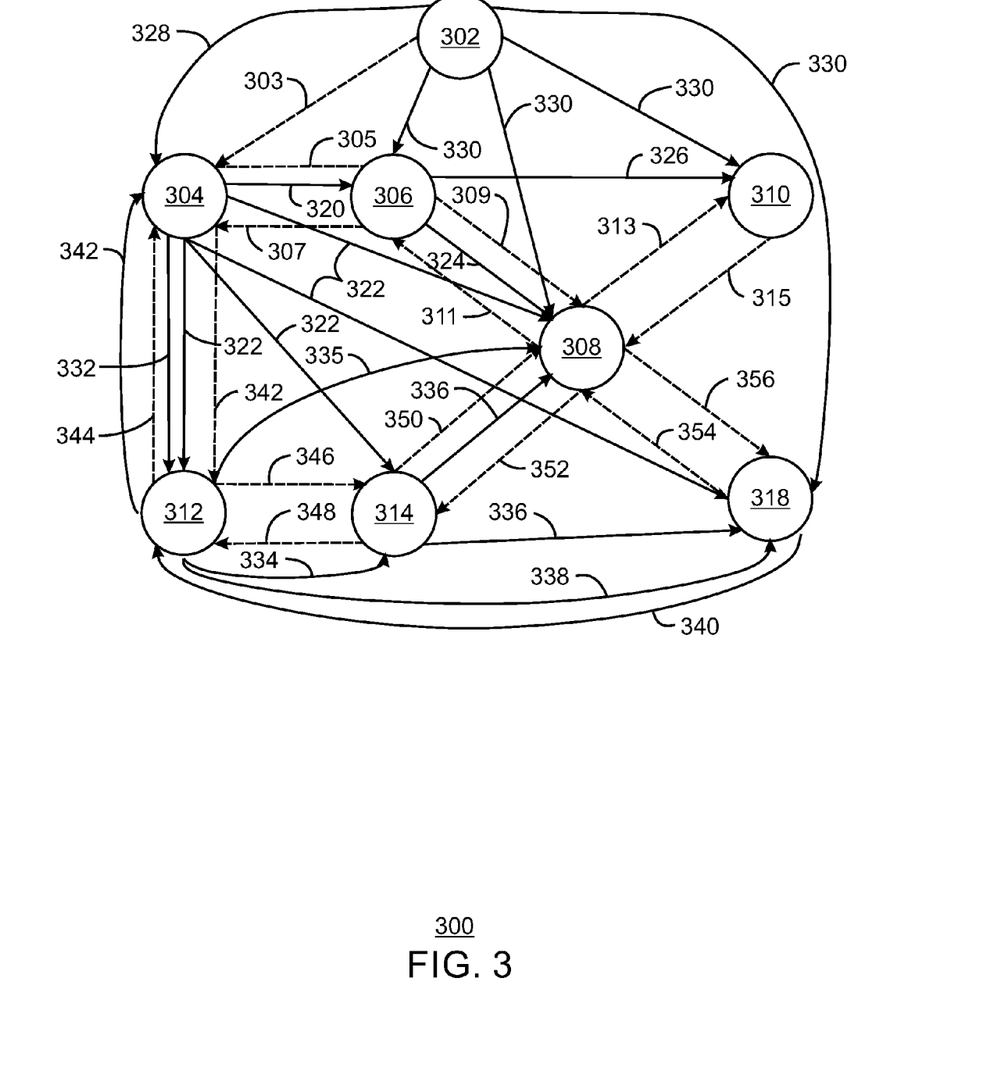
FIG. 3 is a graph formed based on the screens and dataflow of an application.

FIG. 3 is a graph formed based on the screens and dataflow of an application. The graph 300 includes an entry node 302 and screens of a computer program are represented as nodes 304, 306, 308, 310, 312, 314 in a finite state machine graph. The entry node 302 is a virtual initial state of the finite state machine, and does not represent a screen. The dashed arrows represent control flow, and the solid arrows represent data flow. Data flow arrows are labeled with a data item transmitted. For example, a customer identification (cID) may be entered at a screen associated with the node 304, and may flow to nodes that may require the cID, such as nodes 308, 312, 314, and 318, as indicated by the arrows 322. The graph illustrated in FIG. 3 is based on the screens discussed above in reference to FIG. 2. Screen 204 of FIG. 2 is represented as node 304 in FIG. 3. Screen 206 of FIG. 2 is represented as node 306 in FIG. 3. Screen 210 of FIG. 2 is represented as node 310 in FIG. 3. Screen 212 of FIG. 2 is represented as node 312 in FIG. 3, and screen 214 of FIG. 2 is represented as node 314 in FIG. 3. Screen 218 of FIG. 2 is represented as node 318 in FIG. 3. In embodiments, the screens 208 and 216 of FIG. 2 may be implemented using the same or similar code, and are combined as node 308 in FIG. 3. Although the graph 300 illustrated in FIG. 3 is implemented to represent the screens and data flow between the screens discussed above in reference to FIG. 2, other computer programs may be implemented by representing the screens as nodes and data flow as edges of a finite state machine graph is a similar manner as described herein.

As illustrated in FIG. 3, each of the screens is represented as a node indicating a state in the graph 300. Control flow between screens indicated by the dashed arrows 220, 222, 224, 226, 228, 230 in FIG. 3, are indicated as dashed arrows in in the finite state machine graph 300 of FIG. 3. Data flow is defined by the state, such as the options of a given screen, and data flow associated with a given option are represented as solid edges indicated by solid arrows in the finite state machine graph 300 of FIG. 3. For example, if a variable is selected in screen 204 and subsequently used in screen 206, a data flow edge is added from node 304 to node 306 in the graph 300.

Initially, at screen 204 of FIG. 2, a user may attempt to login. An entry node 302 may provide data from a customer database for the user based on the login as indicated by the arrow 328. The dashed arrow 303 indicates a control flow from a dummy state 302. If a user enters a query at screen 204 of FIG. 2 the control flow is indicated by dashed arrow 305. If the user selects to back to screen 204 of FIG. 2, a control flow edge is indicated by the dashed arrow 307. Upon entering a query, data indicating a search string associated with the query will flow from node 304 to node 306 as illustrated by arrow 320. The user may select a specific item from screen 206 of FIG. 2 and the event is indicated by the dashed arrow 309 while the event wherein a user selects to go back from screen 208 in FIG. 2 is indicated by the dashed arrow 311. When the user selects a specific item from screen 206 of FIG. 2, data indicating the specific item selected may flow from node 306 to node 308, as indicated by arrow 324.

A user may select a picture of a selected item at screen 208 of FIG. 2, as indicated by dashed arrow 313. The user may select to go back from screen 210 of FIG. 2 and return to screen 208 of FIG. 2 as indicated by the dashed line 315. If at screen 208 of FIG. 2 the user selects the picture of the selected item at screen 208 of FIG. 2, data indicating the specific item selected may flow from 306 to node 310 as indicated by arrow 326.

As discussed above, a user may select to leave feedback at screen 204 of FIG. 2, and this control flow is indicated by the dashed arrow 342. The user may select to go back from the screen 212 of FIG. 2, as indicated by the dashed arrow 344. To leave feedback, a cID is required at nodes 312, 314, 318, and 308. If a user logs in using a cID on screen 204 of FIG. 2, data indicating the cID may flow from node 304 to any other node, such as nodes 308, 312, 314, and 318 that may require the user identification as indicated by arrows 322. Further, if at screen 204 of FIG. 2 a user selects to leave feedback, data from the customer database indicating specific items for which the user has not left feedback may flow from the node 304 to the node 312 as indicated by the arrow 332.

An event may include a user selecting at screen 212 of FIG. 2 to leave feedback for recently purchased items, as indicated by the dashed arrow 346. The dashed arrow 348 indicates that an event including the user selecting to return to screen 212 from screen 214 of FIG. 2. Similar events are indicated by the arrows 350, 352, between nodes 314 and 308, and dashed arrows 354 and 356 between nodes 308 and 318.

If at screen 212 of FIG. 2 a user selects to leave feedback for recently purchased items, data from the customer database may flow from the node 312 to the node 314 as indicated by the arrow 334, and from node 312 to node 308 as indicated by the arrow 335. If at screen 214 of FIG. 2 the user a selects a recently purchased item to leave feedback for, data indicating the selected item will flow from the node 314 to the node 308 and node 318, as indicated by the arrows 336, as well as data from the customer database from node 312 to node 318 as indicated by the arrow 338. Once feedback has been entered at screen 218 of FIG. 2, data indicating an update to the customer database will flow from node 318 to node 312 as indicated by the arrow 340, and from node 312 to node 304 as indicated by arrow 342.

The entry node 302 may be a server-side node enabling access to an item database and a customer database. The item data base may be needed at each of nodes 306, 308, 310, 318. The data flow of item database data from entry node 302 to each of the nodes 306, 308, 310, and 318 as indicated by the arrows 330.

As discussed above, the finite state machine graph 300 is a representation of a mobile computing program. In some embodiments, the representation illustrated in FIG. 3 may be used for program slicing including generation of a subprogram slice based on the subset of screens of the mobile computing program such the slice produces the same behavior of the mobile computing program.

Figure 4:
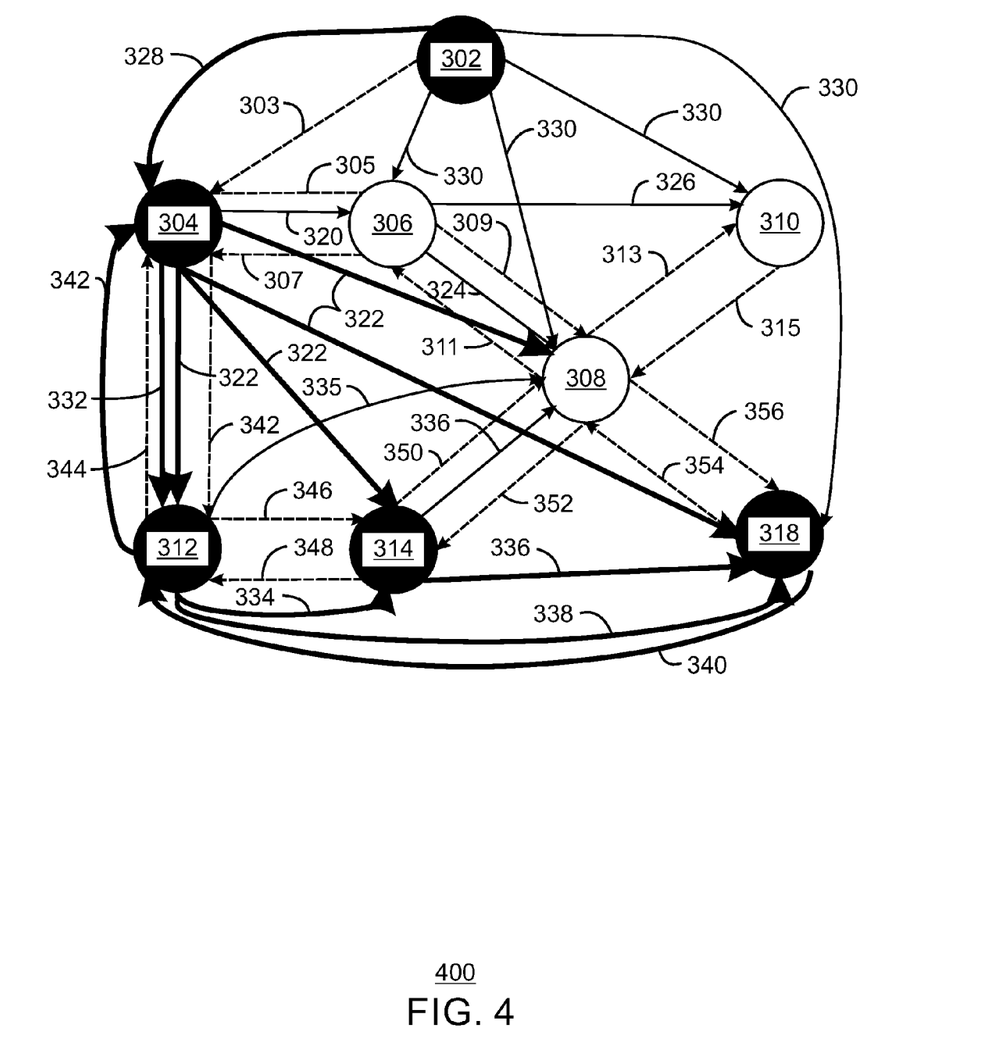
FIG. 4 is an illustration of a slice based on the screens of an application.

FIG. 4 is an illustration of a slice based on the screens of an application. As discussed above in reference to FIG. 3, a slice may be generated using the representation of a mobile computing program based on screens of the mobile computing program. However, generation of the slice may be generated without the representation discussed above. Whether or not a representation, such as the representation discussed in reference to FIG. 3 is used, a slice may be generated based on a subset of screens such that the slice produces the same behavior as the mobile computing program.

For example, screen 8 of FIG. 2 may include an element having a behavior enabling feedback to be input by the user. The feedback mechanism may be thought of as a behavior. A "behavior," as referred to herein is an action or event that may occur as a result of a functional element of a given screen. In the example of screen 8 of FIG. 2, the feedback element is associated with the behavior of presenting a feedback option to the user, and receiving feedback to be entered into the customer database. However, some screens may not be required to generate a slice enabling the user to enter feedback for a given item. As illustrated in FIG. 4, the node 318 as well as nodes 302, 304, 312, and 314, are shaded to indicate a subprogram slice based on the screens associated with the shaded nodes.

As discussed in reference to FIG. 3, data flow between the screens is determined, and the subset of screens for slice generation is determined based on data-flow dependencies between the screens. In the example illustrated in FIG. 4, the screens associated with 304, 312, and 314, as well as the entry node 302 are a subset of screens from which the behavior including the feedback function of screen 8 depends. Therefore, the slice generation is based on the subset of screens in view of the data-flow dependencies illustrated by the bolded arrows 322, 328, 334, 336, 338, 340, and 342.

Figure 5:
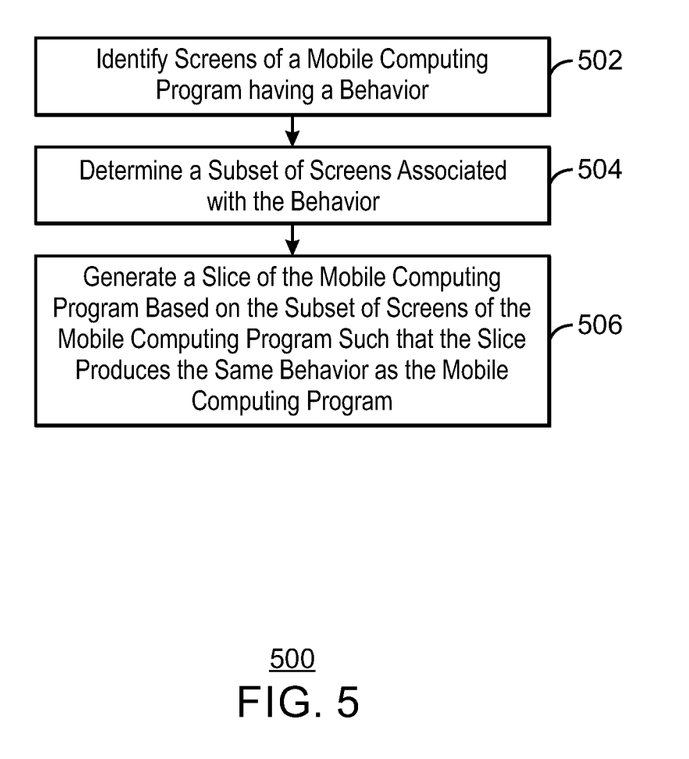
FIG. 5 is a block diagram illustrating a method of forming a graph of a finite state machine.
Figure 6:
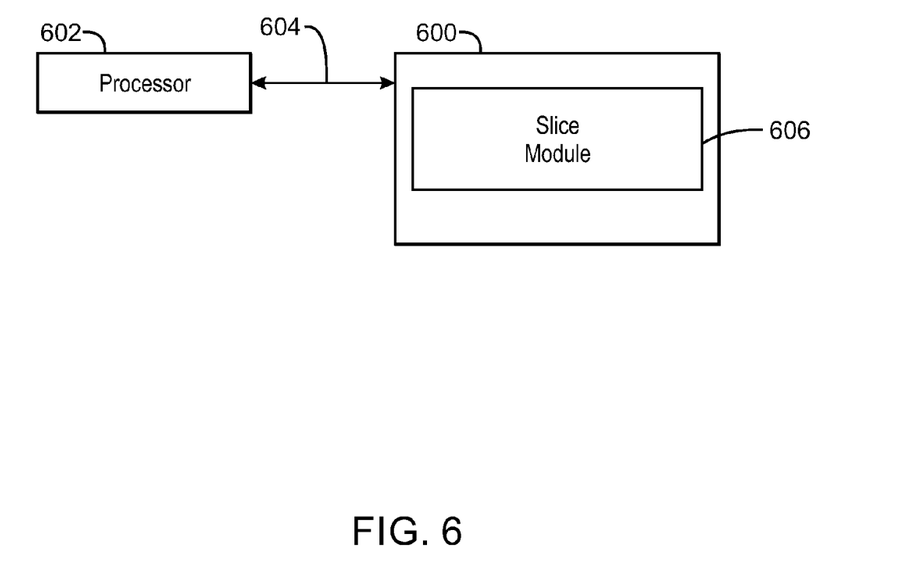
FIG. 6 is a block diagram depicting an example of a tangible, non-transitory computer-readable medium that can be used to form a graph of a finite state machine.

FIG. 5 is a block diagram illustrating a method of forming a graph of a finite state machine. The method 500 may include i identifying screens of a mobile computing program having a behavior at block 502, and determining a subset of screens associated with the behavior at block 504. At block 506, a slice of the mobile computing program is generated based on the subset of screens of the mobile computing program such the slice produces the same behavior of the mobile computing program.

In embodiments, the identified screens are represented as nodes in the graph and data flow is represented as edges of the graph. In some embodiments, the data flow between the screens is used to determine the subset of screens for slice generation. The data flow dependencies of a between the screens for a given behavior is used to determine the subset and generate the slice.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++, JavaScript, objective C and C#, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 5 is a block diagram depicting an example of a tangible, non-transitory computer-readable medium that can be used to form a graph of a finite state machine. The tangible, non-transitory, computer-readable medium 500 may be accessed by a processor 502 over a computer bus 504. Furthermore, the tangible, non-transitory, computer-readable medium 500 may include computer-executable instructions to direct the processor 502 to perform the steps of the current method.

The various software components discussed herein may be stored on the tangible, non-transitory, computer-readable medium 500, as indicated in FIG. 5. For example, a slice module 506 may be configured to identify screens of a mobile computing program having a behavior. The slice module 606 may determine a subset of screens associated with the behavior. The slice module 606 may generate a slice based on the subset of screens of the mobile computing program such the slice produces the same behavior of the mobile computing program.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
    identifying, via one or more processing devices, screens of a mobile computing program having a behavior;
    determining, via the one or more processing devices, a subset of the identified screens associated with the behavior; and
    generating, via processing device, a slice of the mobile computing program based on the subset of the identified screens of the mobile computing program such that the slice produces the same behavior as the mobile computing program; and
    determining, via the one or more processing devices, data flow between the screens, wherein the subset of screens is determined based on data flow dependencies between the screens associated with the behavior.

2. The method of claim 1, wherein the identified screens are correlated with states of a finite state machine graph, and wherein the identified screens are represented as nodes in the graph and data flow is represented as edges of the graph.

3. The method of claim 1, comprising identifying, via one or more processing devices, an element of the screen associated with the behavior.

4. The method of claim 1, wherein the screens are rendered on a graphical user interface of a computing device.

5. The method of claim 1, wherein the mobile computing program is to be implemented on a mobile computing device.

6. The method of claim 1, wherein the mobile computing program is to be implemented as:
    an enterprise application;
    a web application; or
    any combination thereof.

7. A computing device, comprising:
    a storage device;
    a processor;
    the storage device having instructions that when executed by the processor, cause the computing device to:
    identify screens of a mobile computing program having a behavior;
    determine a subset of the identified screens associated with the behavior; and
    generate a slice of the mobile computing program based on the subset of the identified screens of the mobile computing program such that the slice produces the same behavior as the mobile computing program;
    wherein the instructions that when executed by the processor, cause the computing device to determine data flow between the screens, and wherein the subset of screens is determined based on data flow dependencies between the screens associated with the behavior.

8. The computing device of claim 7, wherein the identified screens are correlated with states of a finite state machine graph, and wherein the identified screens are represented as nodes in the graph and data flow is represented as edges of the graph.

9. The computing device of claim 7, wherein the instructions that when executed by the processor, cause the computing device to identify an element of the screen associated with the behavior.

10. The computing device of claim 7, wherein the screens are rendered on a graphical user interface of a computing device.

11. The computing device of claim 7, wherein the mobile computing program is to be implemented on a mobile computing device.

12. The computing device of claim 7, wherein the mobile computing program is to be implemented as:
    an enterprise application;
    a web application; or
    any combination thereof.

13. A computer program product for program slicing, the computer product comprising a computer readable storage medium having program code embodied therewith, the program code executable by a processor to perform a method, comprising:

identifying, by the processor, screens of a mobile computing program having a behavior;

determining, by the processor, a subset of the identified screens associated with the behavior; and generating, by the processor, a slice of the mobile computing program based on the subset of the identified screens of the mobile computing program such that the slice produces the same behavior as the mobile computing program; and determining data flow between the screens, wherein the subset of screens is determined based on data flow dependencies between the screens associated with the behavior.

14. The computer program product of claim 13, wherein the identified screens are correlated with states of a finite state machine graph, and wherein the identified screens are represented as nodes in the graph and data flow is represented as edges of the graph.

15. The computer program product of claim 13, the method further comprising identifying an element of the screen associated with the behavior.

16. The computer program product of claim 13, wherein the screens are rendered on a graphical user interface of a computing device.

17. The computer program product of claim 13, wherein the mobile computing program is to be implemented:
on a mobile computing device;
as an enterprise application; as:
a web application; or
any combination thereof.

* * * * *